United States Patent
Meki (10) Patent No.: US 10,430,235 B2
(45) Date of Patent: Oct. 1, 2019

(54) TASK MANAGING DEVICE FOR MANAGING TASKS RELATING TO AN ACCOUNTING PROCESS, TASK MANAGING METHOD AND NON-TRANSITORY COMPUTER-READABLE MEDIUM

(71) Applicant: CASIO COMPUTER CO., LTD., Shibuya-ku, Tokyo (JP)

(72) Inventor: Masaharu Meki, Akishima (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 171 days.

(21) Appl. No.: 15/256,515

(22) Filed: Sep. 3, 2016

(65) Prior Publication Data
US 2017/0185447 A1    Jun. 29, 2017

(30) Foreign Application Priority Data
Dec. 28, 2015 (JP) .................... 2015-255637

(51) Int. Cl.
*G06F 9/46* (2006.01)
*G06F 9/48* (2006.01)
*G06Q 40/00* (2012.01)

(52) U.S. Cl.
CPC .......... *G06F 9/4881* (2013.01); *G06F 9/4843* (2013.01); *G06Q 40/12* (2013.12)

(58) Field of Classification Search
CPC .............. G06F 9/4881; G06Q 40/12
See application file for complete search history.

(56) References Cited

U.S. PATENT DOCUMENTS

| 8,626,769 B1* | 1/2014 | Bhatt | G06Q 40/12 707/740 |
| 2002/0041399 A1* | 4/2002 | Ichikawa | H04N 1/00209 358/402 |
| 2003/0050876 A1* | 3/2003 | Tawara | G06Q 30/04 705/30 |
| 2005/0222929 A1* | 10/2005 | Steier | G06Q 40/00 705/35 |
| 2006/0129929 A1* | 6/2006 | Weber | G06F 17/246 715/267 |

(Continued)

FOREIGN PATENT DOCUMENTS

JP    2014518409 A    7/2014

*Primary Examiner* — Adam Lee
(74) *Attorney, Agent, or Firm* — Holtz, Holtz & Volek PC (57) ABSTRACT

A task managing device facilitates and assists in execution of tasks relating to an accounting process. The device refers to management information in which task items to be completed are defined. The task items are displayed on a display screen in association with checkboxes which are selectable by a user to input completion of the respective task items. If a checkbox is selected to input completion of the associated task item, the device determines, based on the management information, whether an accounting process task needs to be performed for the completed task item. If the accounting process task needs to be performed, the device switches the display screen to an accounting process screen, and enters past data associated with a predetermined data input item in a past accounting process task in data input regions corresponding to the accounting process task.

9 Claims, 7 Drawing Sheets

(56) References Cited

U.S. PATENT DOCUMENTS

| | | | |
|---|---|---|---|
| 2006/0149643 A1* | 7/2006 | Reiner | G06Q 10/10 |
| | | | 705/30 |
| 2010/0318926 A1* | 12/2010 | Anderson | G06Q 10/10 |
| | | | 715/763 |
| 2011/0080612 A1* | 4/2011 | Park | G06F 3/1207 |
| | | | 358/1.15 |
| 2012/0166270 A1* | 6/2012 | Coppinger | G06Q 30/0236 |
| | | | 705/14.36 |
| 2012/0309363 A1 | 12/2012 | Gruber et al. | |
| 2012/0311583 A1 | 12/2012 | Gruber et al. | |
| 2012/0311584 A1 | 12/2012 | Gruber et al. | |
| 2012/0311585 A1 | 12/2012 | Gruber et al. | |
| 2013/0046573 A1* | 2/2013 | Zubizarreta | G06Q 10/06 |
| | | | 705/7.15 |
| 2013/0066755 A1* | 3/2013 | Petersen | G06Q 10/06375 |
| | | | 705/30 |
| 2014/0156512 A1* | 6/2014 | Rahman | G06Q 20/10 |
| | | | 705/39 |
| 2015/0262098 A1* | 9/2015 | Kinsey | G06Q 10/10 |
| | | | 705/7.38 |

\* cited by examiner

WORK TASK DATABASE DB

| TASK | DISPLAY START DATE | DUE DATE | RELATED TASK | ACCOUNT HEADINGS | ABSTRACT | COORDINATION WITH SALARY MANAGEMENT |
|---|---|---|---|---|---|---|
| PAYMENT OF AUTOMOBILE TAX | MAY 1, 20XX | MAY 31, 20XX | ACCOUNTING (JOURNAL INPUT) | TAX AND DUES | AUTOMOBILE TAX | — |
| PAYMENT OF EMPLOYEES' RESIDENT TAX FOR JUNE | JUNE 1, 20XX | JUNE 10, 20XX | ACCOUNTING (JOURNAL INPUT) | DEPOSIT RECEIVED | PAYMENT OF EMPLOYEES' RESIDENT TAX FOR JUNE, 20XX | ○ |
| PAYMENT OF FIXED ASSETS TAX (FIRST PERIOD) | JUNE 1, 20XX | JUNE 30, 20XX | ACCOUNTING (JOURNAL INPUT) | TAX AND DUES | FIXED ASSETS TAX (FIRST PERIOD) | — |
| PAYMENT OF EMPLOYEES' RESIDENT TAX FOR JULY | JULY 1, 20XX | JULY 10, 20XX | ACCOUNTING (JOURNAL INPUT) | DEPOSIT RECEIVED | PAYMENT OF EMPLOYEES' RESIDENT TAX FOR JULY, 20XX | ○ |
| ... | ... | ... | ... | ... | ... | ... |

TASK MANAGING DEVICE FOR MANAGING TASKS RELATING TO AN ACCOUNTING PROCESS, TASK MANAGING METHOD AND NON-TRANSITORY COMPUTER-READABLE MEDIUM

BACKGROUND OF THE INVENTION

1. Field of the Invention

The present invention relates to a task managing device, a task managing method and a computer readable medium.

2. Background Art

Traditionally, there is known a to-do task management for managing task items (tasks) which need to be carried out by predetermined due dates. There is also known a technique to generate a task item on the basis of user's input and the context of the input (for example, see Japanese Unexamined Patent Application Publication (Translation of PCT Application) No. 2014-518409).

However, since the technique of Japanese Unexamined Patent Application Publication (Translation of PCT Application) No. 2014-518409 only manages task items, this technique cannot be applied to the accounting processes of companies that require journalizing processes relating to daily transactions and the like.

Further, although accounting software is used for accounting processes recently, a technical knowledge is needed to carry out journal inputs, especially to select account headings. Thus, this can be a great burden to sole proprietors and small and medium-sized business companies who are not used to such accounting processes.

SUMMARY OF THE INVENTION

An object of the present invention is to carry out the accounting processes much easier.

According to an aspect of the present invention, there is provided a task managing device including: a first determining unit which refers to management information in which task items which need to be carried out are defined and determines whether there exists a related task which is associated with a task item which is already carried out and whether the related task corresponds to an accounting process; and a process executing unit which, in a case where it is determined that there exists the related task and that the related task corresponds to the accounting process by the first determining unit, executes the accounting process corresponding to the related task and sets various data relating to the task item which is already carried out defined in the management information in data input regions corresponding to the related task.

According to another aspect of the present invention, there is provided a task managing method by using a task managing device, including: a first determining whether there exists a related task which is associated with a task item which is already carried out and whether the related task corresponds to an accounting process by referring to management information in which task items which need to be carried out are defined; and executing the accounting process corresponding to the related task and setting various data relating to the task item which is already carried out defined in the management information in data input regions corresponding to the related task in a case where it is determined that there exists the related task and that the related task corresponds to the accounting process in the first determining.

According to still another aspect of the present invention, there is provided a non-transitory computer readable medium storing a program for making a computer execute a process, the process including: determining whether there exists a related task which is associated with a task item which is already carried out and whether the related task corresponds to an accounting process by referring to management information in which task items which need to be carried out are defined; and executing the accounting process corresponding to the related task and setting various data relating to the task item which is already carried out defined in the management information in data input regions corresponding to the related task in a case where it is determined that there exists the related task and that the related task corresponds to the accounting process.

According to the present invention, the accounting processes can be carried out much easier.

BRIEF DESCRIPTION OF THE DRAWINGS

The above and other objects, advantages are features of the present invention will become more fully understood from the detailed description given hereinbelow and the appended drawings which are given by way of illustration only, and thus are not intended as a definition of the limits of the present invention, and where.

DETAILED DESCRIPTION OF THE PREFERRED EMBODIMENTS

Hereinafter, a specific embodiment of the present invention will be described with reference to the drawings. The examples shown in the drawings do not limit the scope of the invention.

First, the schematic configuration of the task management system 100 will be described with reference to FIG. 1.

Figure 1:
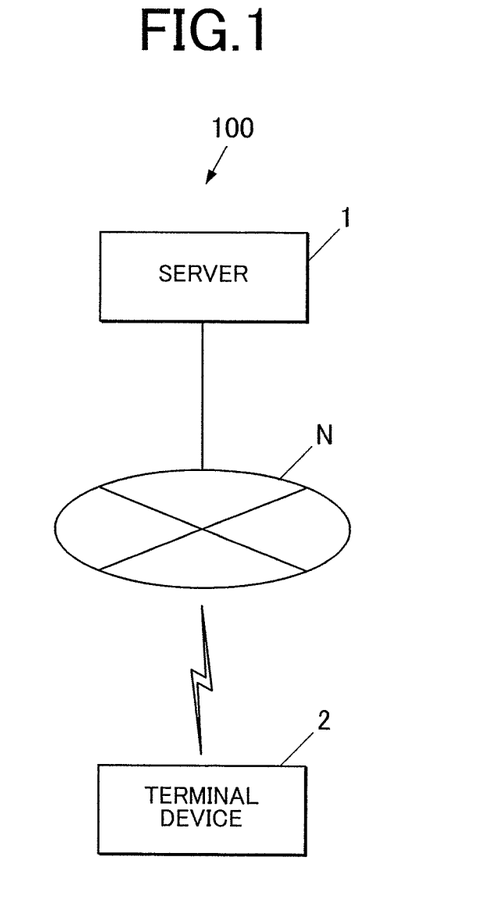
FIG. 1 shows a schematic configuration of a task management system according to an embodiment of the present invent ion.

FIG. 1 shows the schematic configuration of the task management system 100.

As shown in FIG. 1, the task management system 100 of the embodiment includes a server 1 as a task managing device and a terminal device 2. The server 1 and the terminal device 2 are connected so as to send and receive information between each other via a communication network N.

The server 1 is, for example, a server on a cloud.

The server 1 manages the task items (tasks) which need to be carried out by a user of the terminal device 2 and carries out the accounting processes associated with the task items.

The terminal device 2 is, for example, a terminal device owned by a user (a sole proprietor) who is a private business owner, a small or medium-sized business owner, a private shop owner or the like. As for the terminal device 2, a smart phone, a tablet PC (Personal Computer), a mobile phone, a PDA (Personal Digital Assistant), a notebook PC, a desktop PC and the like are suggested.

The terminal device 2 receives an operation input carried out by a user, sends information relating to the operation input to the server 1 and displays received information which is sent from the server 1 by using a browser or the like.

The communication network N is, for example, an internet. However, the communication network N can be another network such as a LAN (Local Area Network).

The task management system 100 of the embodiment shown in the drawing includes one terminal device 2 for the server 1. However, this configuration is merely an example and is not limitative in any way.

For example, although it is not shown in the drawings, a plurality of terminal devices 2 can be connected to the server 1 and the server 1 can manage the terminal devices in an integrated manner.

Further, the number of server 1 is not limited to one and a plurality of servers 1 can be included.

Next, the functional configuration of the server 1 will be described with reference to FIG. 2.

Figure 2:
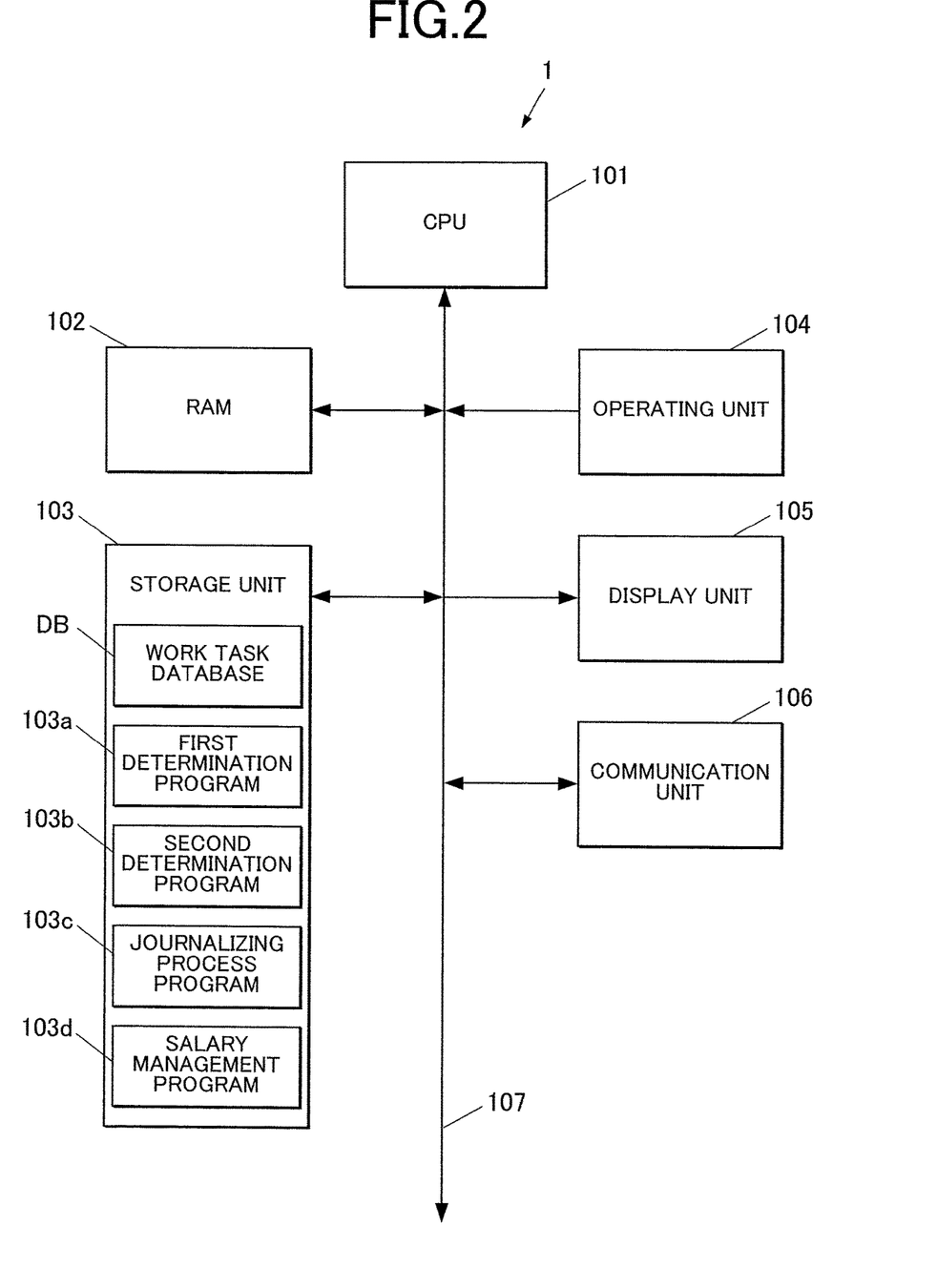
FIG. 2 is a block diagram showing a functional configuration of a server included in the task management system shown in FIG. 1.

FIG. 2 is a block diagram showing the functional configuration of the server 1 included in the task management system 100.

As shown in FIG. 2, the server 1 includes a CPU 101, a RAM 102, a storage unit 103, an operating unit 104, a display unit 105 and a communication unit 106. The individual units of the server 1 are connected to each other via a bus 107.

The CPU (Central Processing Unit) 101 controls the individual units of the server 1. Among the system program and the application programs stored in the storage unit 103, the CPU 101 reads out a specified program, opens the specified program in the work area of the RAM 102 and executes various types of processes according to the program.

The RAM (Random Access Memory) 102 is, for example, a volatile memory. The RAM 102 includes the work area where various types of programs which are read out by the CPU 101 and data are temporarily stored.

The storage unit 103 is formed by including, for example, an HDD (Hard Disk Drive), a SSD (Solid State Drive) or the like. The storage unit 103 is a storage unit in which data and programs can be written and from which data and programs can be read out. In the storage unit 103, a work task database DB, the first determination program 103a, the second determination program 103b, a journalizing process program 103c and a salary management program 103d are stored.

Here, the work task database DE will be described with reference to FIG. 3.

Figure 3:
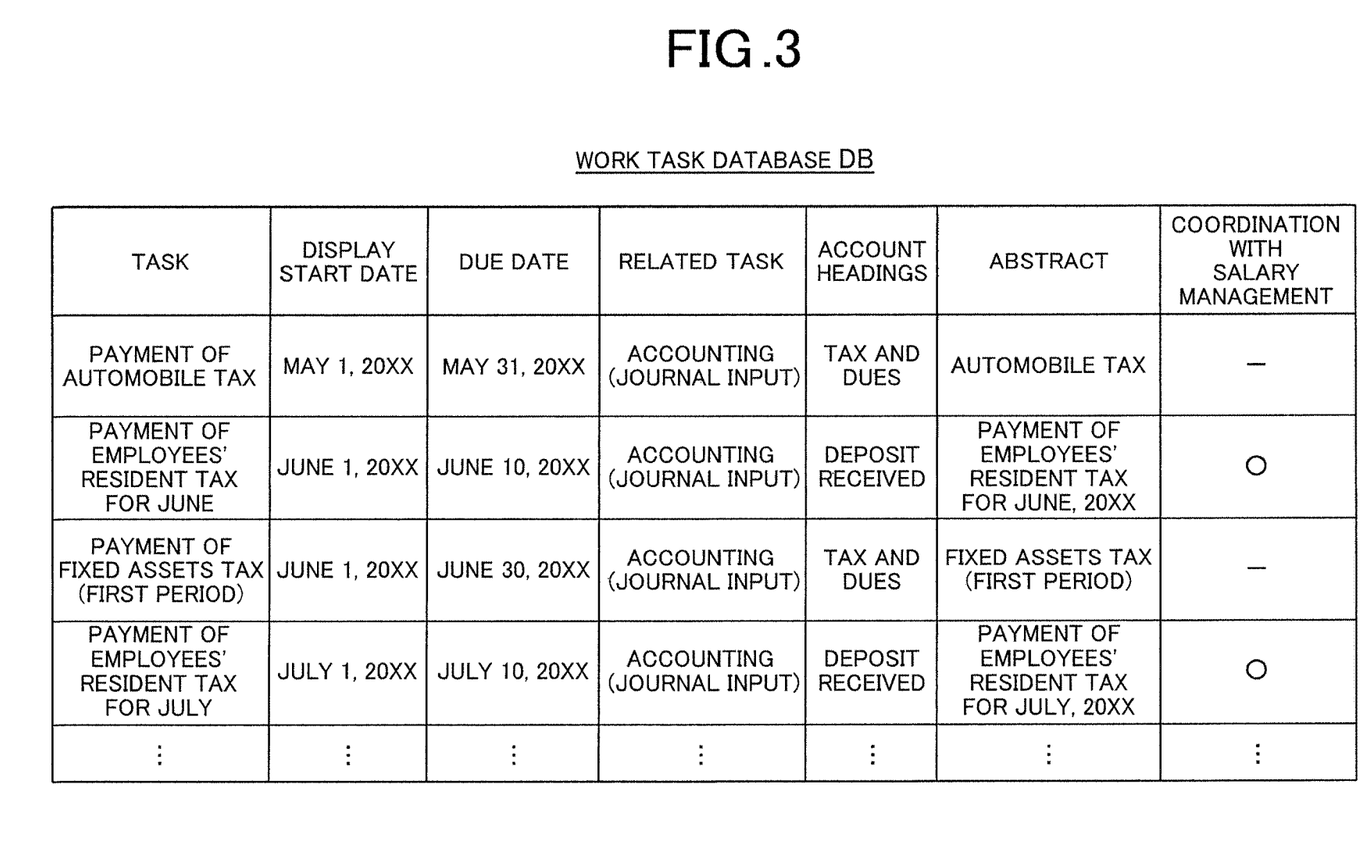
FIG. 3 shows an example of a work task database which is stored in the server device shown in FIG. 2.

FIG. 3 shows an example of the work task database DB.

The work task database DE is used for the task management of a user, and is management information in which task items which need to be carried out by the user are defined.

In particular, as shown in FIG. 3, in the work task database DB, each task item which needs to be carried out by a user is stored by being associated with "task" which indicates the content of the task, "display start date" which indicates the date to start displaying the to-do task C (see the after-mentioned FIG. 5), "due date" which indicates the due date for carrying out the task, "related task" which indicates the content of a related task which is associated with the task item, "account heading" which indicates the content of the account heading for journal input, "abstract" which indicates the content of the transaction abstract for journal input and "coordination with salary management" which indicates whether coordination with the salary management process is required.

For example, "payment of automobile tax" as the "task", "May 1, 20xx" as the "display start date", "May 31, 20xx" as the "due date", "accounting (journal input)" as the "related task", "tax and dues" as the "account heading", "automobile tax" as the abstract" and "- (bar)" which indicates that coordination with the salary management process is not required as the "coordination with salary management" are stored by being associated with each other.

Further, "payment of employees' resident tax for June" as the "task", "June 1, 20xx" as the "display start date", "June 10, 20xx" as the "due date", "accounting (journal input)" as the "related task", "deposit received" as the "account heading", "payment of employees' resident tax for June, 20xx" as the "abstract" and "a (single circle)" which indicates that coordination with the salary management process is required as the "coordination with salary management" are stored, by being associated with each other.

Further, "payment of fixed assets tax (first period)" as the "task", "June 1, 20xx" as the "display start date", "June 30, 20xx" as the "due date", "accounting (journal input)" as the "related task", "tax and dues" as the "account heading", "fixed assets tax (first period)" as the "abstract" and "-" which indicates that coordination with the salary management process is not required as the "coordination with salary management" are stored by being associated with each other.

Further, "payment of employees' resident tax for July" as the "task", "July 1, 20xx" as the "display start date", "July 10, 20xx" as the "due date", "accounting (journal input)" as the "related task", "deposit received" as the "account heading", "payment of employees' resident tax for July, 20xx" as the "abstract" and "○" which indicates that coordination with the salary management process is required as the "coordination with salary management" are stored by being associated with each other.

In FIG. 3, "June 1, 20xx" is shown as an example of the format to be stored as "display start date" and "June 10, 20xx" is shown as an example of the format to be stored as "due date". However, in particular, the month, date and year of the actual date such as "June 1, 2016" is to be stored, for example.

The content of the above described work task database DB is merely an example and is not limitative in any way. The work task database DB can be modified as needed.

For example, in the work task database DB, at least one of "account heading" and "abstract" may be associated with each task item which needs to be carried out by a user.

Further, in the work task database DB, expected task items according to a company's business type may be defined in advance, for example.

Further, editing such as adding any new task item, deleting any unnecessary task item and the like may be carried out in the work task database DB.

The first determination program 103a is a program for realizing the function relating to the first determination process in which whether there exists a related task which is associated with a task item which is already carried out is determined.

In the first determination process, if a task item which needs to be carried out defined in the work task database DB has been carried out by a user, the CPU 101 refers to the work task database DB and determines whether there exists a related task which is associated with the task item which is already carried out.

At this time, the CPU 101 may also determine whether the related task associated with the task item which is already carried out corresponds to an accounting process.

In particular, the CPU 101 reads out the first determination program 103a from the storage unit 103 and carries out the first determination process in accordance with the first determination program 103a. Here, the CPU 101 functions as the first determining unit in cooperation with the first determination program 103a.

The second determination program 103b is a program for realizing the function relating to the second determination process in which whether the related task is the journal input of the transaction is determined.

In the second determination process, in the case where it is determined that there exists a related task in the first determination process, the CPU 101 refers to the work task database DB and determines whether the related task is the journal input of the transaction.

In particular, the CPU 101 reads out the second determination program 103b from the storage unit 103 and carries out the second determination process in accordance with the second determination program 103b.

Here, the CPU 101 functions as the second determining unit in cooperation with the second determination program 103b.

The journalizing process program 103c is a program for realizing the function relating to the journalizing process in which the journal input of the transaction is carried out as an accounting process.

That is, the CPU 101 reads out the journalizing process program 103c from the storage unit 103 and carries out the journalizing process in accordance with the journalizing process program 103c.

In particular, in the case where it is determined that there exists a related task in the first determination process and it is determined that the related task is the journal input of the transaction in the second determination process, the CPU 101 refers to the work task database DB and executes the journal input to automatically set various data of "account heading" and "abstract" (for example, "deposit received", "payment of employees' resident tax for July, 20xx" and the like) relating to the task item which is already carried out (for example, "payment of employees' resident tax for July" or the like) in the corresponding data input regions of "account heading" and "transaction abstract" as the journal data.

Here, in the case where it is determined that there exists a related task in the first determination process, the CPU 101 functions as the process executing unit which executes an accounting process corresponding to the related task and sets various data relating to the task item which is already carried out defined in the work task database DE in the data input regions corresponding to the related task in cooperation with the journalizing process program 103c.

Further, in the case where it is determined that the related task is the journal input of the transaction in the second determination process, the CPU 101 sets various data relating to the accounting process and relating to an accounting related process which is other than the journalizing process in the corresponding data input regions as the journal data.

In particular, in the case where "∘" which indicates that coordination with the salary management process is required is associated with the "coordination with salary management" of the task item which is already carried out defined in the work task database DE (for example, "payment of employees' resident tax for July, 20xx" or the like), the CPU 101 obtains the amount of the employees' resident tax for July, 20xx which is calculated in the salary management process (after-mentioned), for example, and automatically sets this obtained amount in the corresponding data input region of "transaction amount" as the journal data.

Here, the employees' resident tax for July, 20xx, for example, which is calculated in the salary management process can be calculated before the journalizing process or can be calculated during the journalizing process.

Here, the salary management process is shown as an example of the accounting related process. However, this example is not limitative in any way and can be changed as needed.

The salary management program 103d is a program for realizing the function relating to the salary management process which manages employees' salary.

That is, the CPU 101 reads out the salary management program 103d from the storage unit 103 and carries out the salary management process including each month's salary calculation, calculation of tax such as the resident tax, calculation of social security payment and the like of each employee, for example, in accordance with the salary management program 103d.

The operating unit 104 includes, for example, a key input unit such as a key board and a pointing device such as a mouse.

The operating unit 104 receives a key input and a position input and outputs the operation information relating to the key input and the position input to the CPU 101.

The display unit 105 is, for example, formed by including a LCD (Liquid Crystal Display), an organic EL (Electro-Luminescence) display or the like, for example.

The display unit 105 displays various types of screens in accordance with instructions of display signals which are output from the CPU 101 and input to the display unit 105.

The communication unit 106 is, for example, formed by including a network card or the like.

The communication unit 106 is connected to the communication network N so as to carry out communication with a device (for example, the terminal device 2 or the like) on the communication network N.

Next, the functional configuration of the terminal device 2 will be described with reference to FIG. 4.

Figure 4:
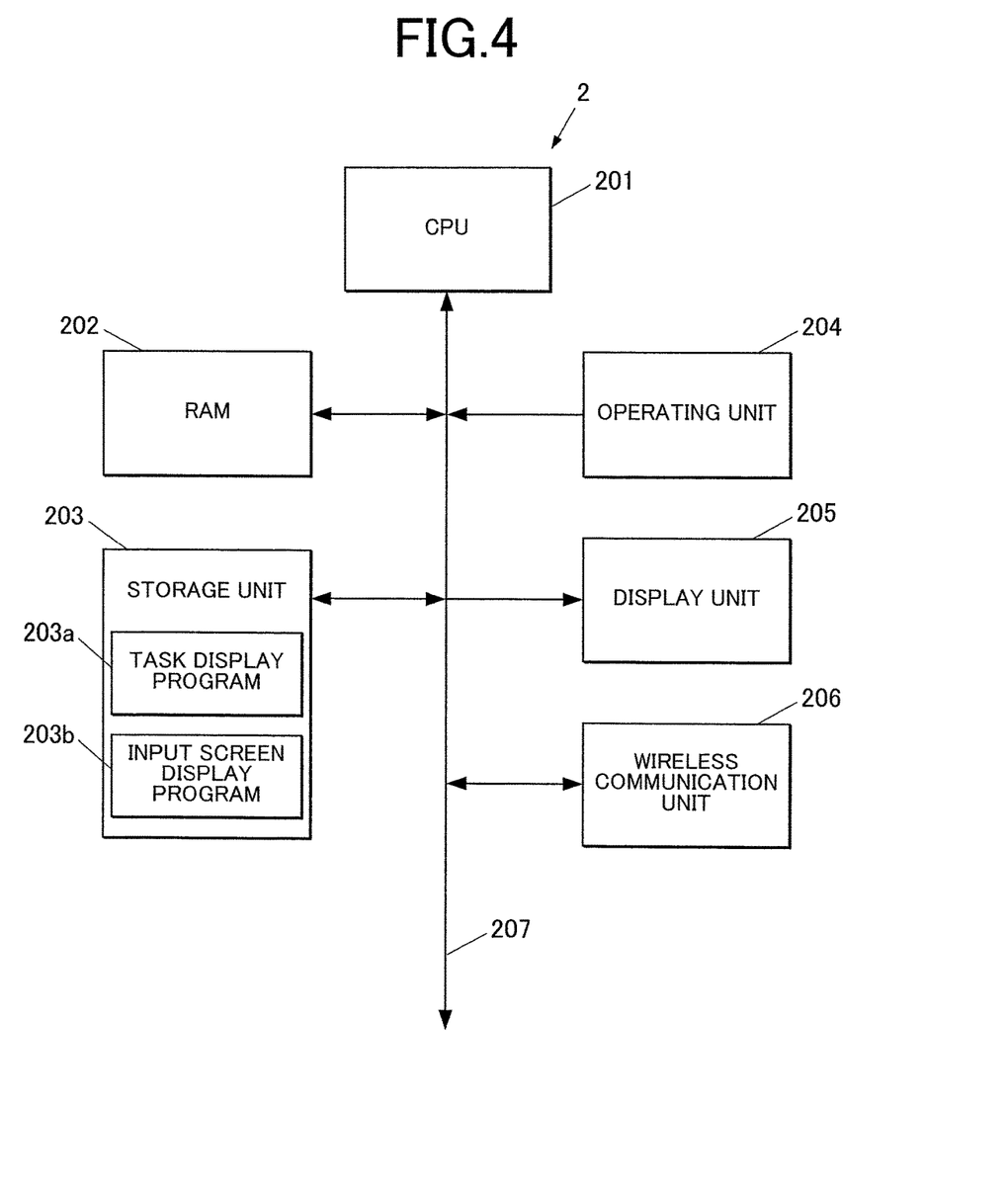
FIG. 4 is a block diagram showing a functional configuration of a terminal device included in the task management system shown in FIG. 1.

FIG. 4 is a block diagram showing the functional configuration of the terminal device 2 included in the task management system 100.

As shown in FIG. 4, the terminal device 2 includes a CPU 210, a RAM 202, a storage unit 203, an operating unit 204, a display unit 205 and a wireless communication unit 206.

The individual units of the terminal device 2 are connected to each other via a bus 207.

The CPU 201 controls the individual units of the terminal device 2.

The CPU 201 reads out a specified program among the system program and the application programs stored in the storage unit 203, opens the specified program in the work area of the RAM 202 and executes various types of processes in accordance with the program.

At that time, the CPU 201 stores various types of process results in the RAM 202 and makes the process results displayed in the display unit 205 as needed.

The RAM 202 is, for example, a volatile memory. The RAM 202 includes the work area where various types of programs and data read out by the PCU 201 are temporarily stored.

The storage unit 203 is formed by including, for example, a flash memory, an EEPROM (Electrically Erasable Programmable Read Only Memory) or the like. The storage unit 203 is a storage unit in which data and programs can be written and from which data and programs can be read out.

In the storage unit 203, a task display program 203a and an input screen display program 203b are stored.

Figure 5:
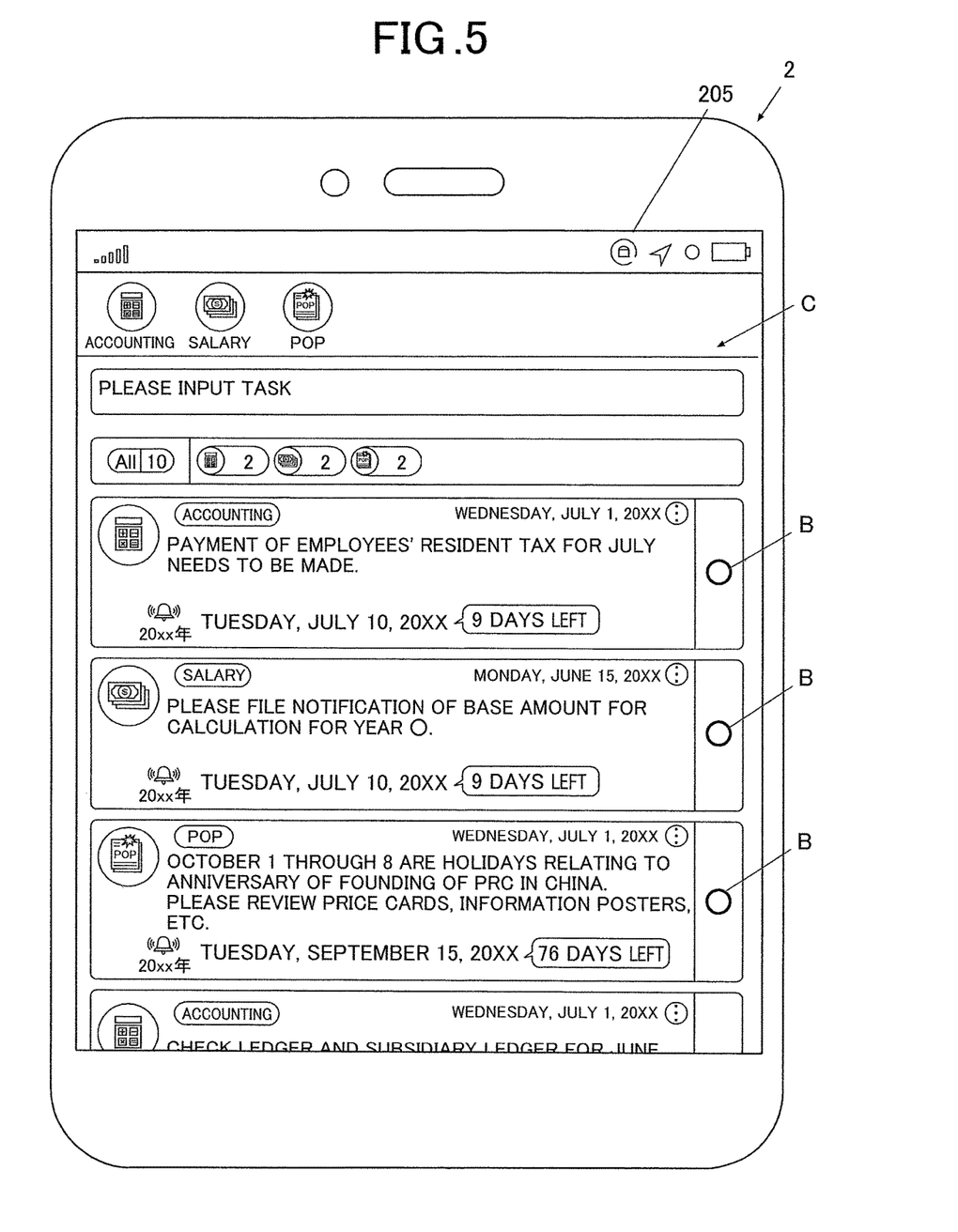
FIG. 5 is a schematic view of an example of a to-do task which is displayed in the terminal device shown in FIG. 4.

The task display program 203a is a program for realizing the function relating to the task display process for displaying the to-do task C (see FIG. 5).

That is, the CPU 201 reads out the task display program 203a from the storage unit 203 and carries out the task display process for displaying the to-do task C in the display unit 205 in accordance with the task display program 203a, the task items which need to be carried out by a user defined in the work task database DB being arranged in the to-do task C in a chronological order.

Here, an example of the to-do task C will be described with reference to FIG. 5.

FIG. 5 is an example of the to-do task C displayed in the display unit 205. In FIG. 5, with "July 1, 20xx" being the reference date, the task items which need to be carried out after the above reference date and the pop-ups (after-mentioned) are schematically arranged.

As shown in FIG. 5, task items relating to the accounting process and the salary management process, pop-ups for getting user's attention and the like are arranged in the to-do task C.

In particular, "due date of payment of employees' resident tax for July, 20xx" as the accounting process, "due date for filing the notification of base amount for calculation for year ○ (single circle)" as the salary management process and "holidays relating to China's anniversary of founding of PRC" as the pop-up are arranged in a chronological order from the top.

At a predetermined position of each task item (for example, at the right end or the like), a task done button B which is to be selected and operated (for example, touch operation or the like) in the case where the task item has been carried out by a user is displayed so as to be associated with the task item.

If the task done button B of any one task item is selected and operated by a user, the display unit 205 cancels the display of the task item and moves up and displays the task items and pop-ups thereafter (not shown in the drawing).

In the case where the task item whose task done button B was selected and operated by a user has a related task associated thereto, the journal input screen G (see FIG. 6) which encourages a user to carry out the journal input as the related task (will be described in details later) can be displayed in the display unit 205.

Here, the content of the above described to-do task C is not limited to the example and can be modified as needed.

Figure 6:
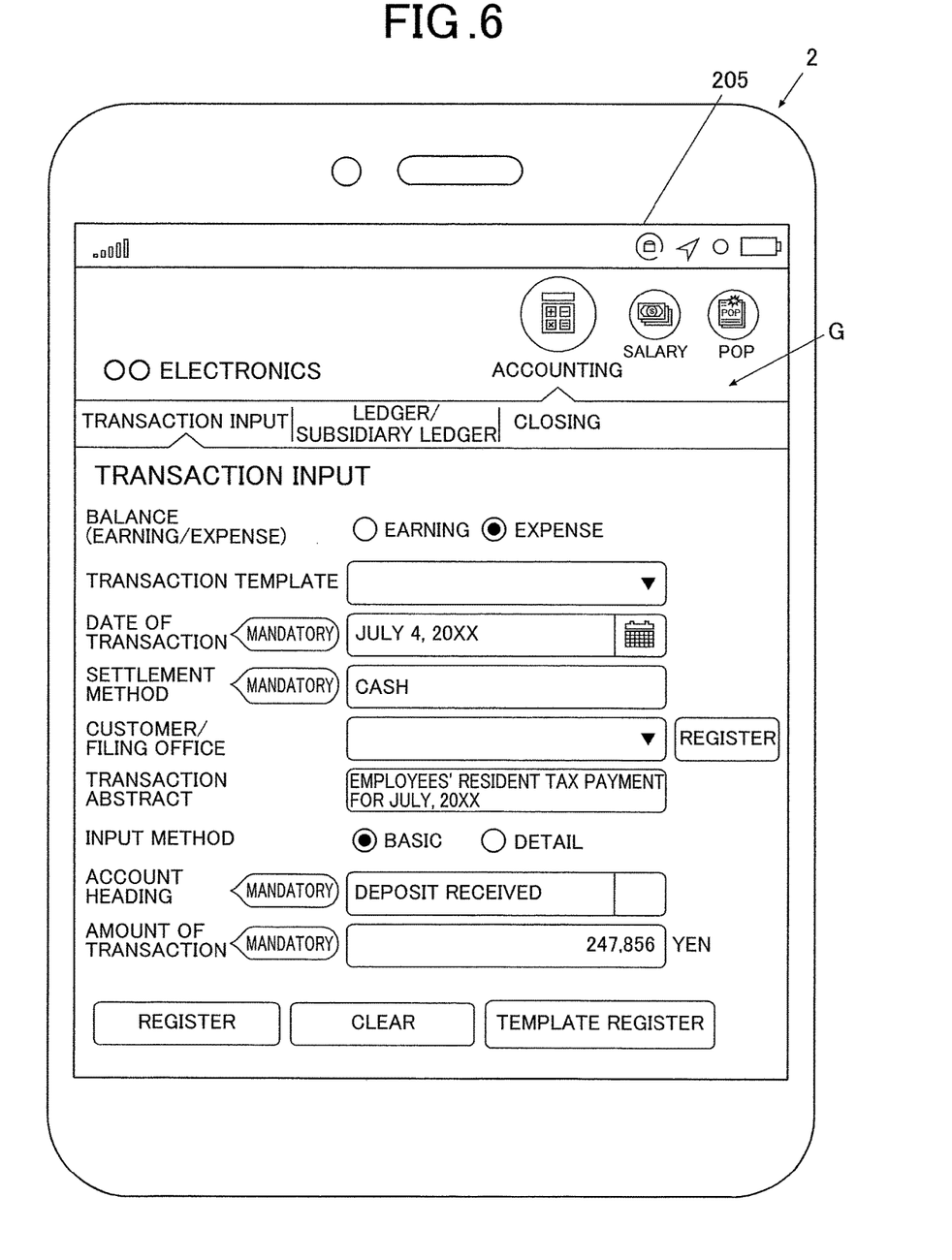
FIG. 6 is a schematic view of an example of a journal input screen which is displayed in the terminal device shown in FIG. 5.

The input screen display program 203b is a program for realizing the function relating to the input screen display process for displaying the journal input screen G.

That is, the CPU 201 reads out the input screen display program 203b from the storage unit 203 and carries out the input screen display for displaying the journal input screen G in the display unit 205 in accordance with the input screen display program 203b. The journal data which are automatically set for the data input regions of "account heading", "transaction abstract", "amount of transaction" and the like are input in the corresponding items in the journal input screen G as a result of the journal input associated with the task item (for example, "payment of employees' resident tax for July" or the like) which is already carried out and whose task done button B is selected and operated being executed by the server 1.

Here, an example of the journal input screen G will be described with reference to FIG. 6.

FIG. 6 is an example of the journal input screen G which is displayed in the display unit 205 and schematically shows what is to be displayed in the case where "payment of employees' resident tax for July, 20xx" has been carried out as the task item.

As shown in FIG. 6, in the journal input screen G, columns of "balance (earning/expense)", "transaction template", "date of transaction", "settlement method", "customer/filing office", "transaction abstract", "input method", "account heading" and "amount of transaction" are arranged in this order from the top.

Among these columns, with respect to the columns "transaction abstract", "account heading" and "amount of transaction", various data which are automatically set by the server 1 for the data input regions in the journalizing process, for example, "deposit received", "payment of employees' resident tax for July, 20xx" and "247,856" are input and displayed.

Further, with respect to the item "date of transaction", the date when the task done button B of the task item which is already carried out is selected and operated, for example, "July 4, 20xx" is input and displayed.

Further, the item "settlement method" indicates whether the settlement method is "cash" or "credit card" and for example, the previous input or a predetermined default setting is input and displayed.

Further, the item "balance (earning/expense)" indicates whether the transaction is "earning" or "expense" and for example, a predetermined default setting (for example, "expense" or the like) is selected and displayed.

In such way, in the journal input screen G, the columns "date of transaction", "settlement method", "account heading" and "amount of transaction" which require input in the journalizing process are displayed in the display unit 205 in the state where the inputs are automatically made thereto.

Here, with respect to the columns of "transaction template", a template can be selected from the templates of various types of transactions. With respect to the columns "customer/filing office" which indicates with whom the transaction was made, a user can register any customer/filing office.

Further, with respect to the columns "input method", "basic" which is set as the predetermined default setting is automatically set. However, by selecting "detail", columns such as "account heading" can be added to carry out more detailed journalizing process.

The operating unit 204 includes, for example, a touch panel and receives a touch input performed by a user and outputs the operation information relating to the touch input to the CPU 201.

The touch panel is formed integrally with the display unit 205. In the touch panel, the X-Y coordinates of the position on the display unit 205 touched by a user are detected by any of the various types of methods such as a capacitive sensing method, a resistive film method and a surface acoustic wave ultrasound method.

The touch panel outputs the positional signals according to the X-Y coordinates of the touched positions to the CPU 201.

The display unit 205 is, for example, formed by including a LCD, an organic EL display or the like.

The display unit 205 further displays various types of screens in accordance with instructions of display signals which are output from the CPU 201 and input to the display unit 205.

The wireless communication unit 206 is, for example, formed by including an antenna, a modulation and demodulation circuit, a signal processing circuit and the like.

The wireless communication unit 206 carries out sending and receiving of information with base stations, access points and the like which are connected to the communication network N by wireless radio waves. The wireless communication unit 206 further carries out communication with a device (for example, the server 1 or the like) on the communication network N.

<Journalizing Process>

Next, the journalizing process carried out in the task management system 100 will be described with reference to FIG. 7.

Figure 7:
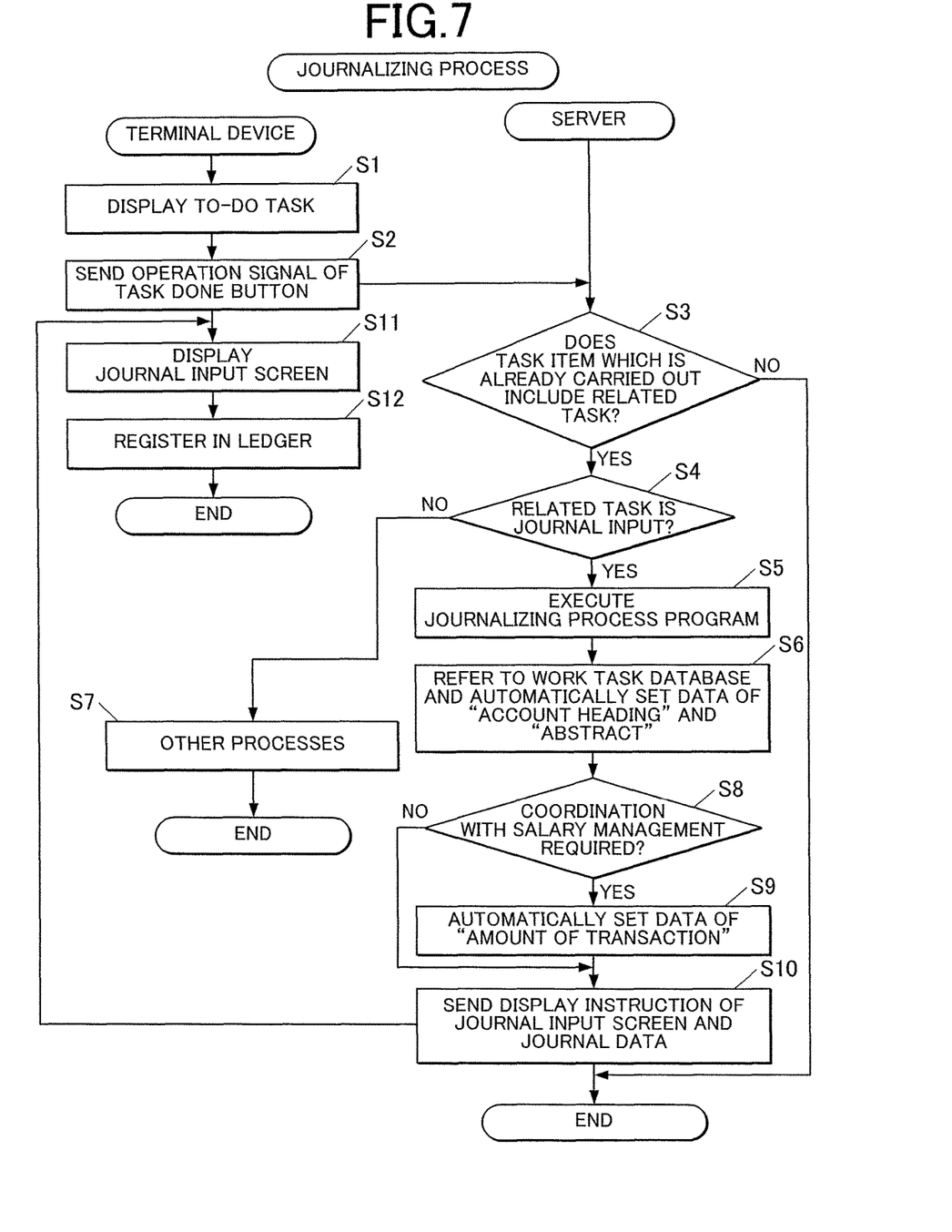
FIG. 7 is a flowchart showing an example of an operation relating to a journalizing process which is carried out by the task management system shown in FIG. 1.

FIG. 7 is a flowchart showing an example of the operation relating to the journalizing process.

As shown in FIG. 7, first, in the terminal device 2, if the to-do task C is instructed to be displayed in accordance with a predetermined operation performed by a user on the operating unit 204, the CPU 201 reads out the task display program. 203a from the storage unit 203 and makes the to-do task. C displayed in the display unit 205 in accordance with the task display program 203a (step S1; see FIG. 5).

In particular, the CPU 201 controls the wireless communication unit 206 to obtain task items which need to be carried out by a user defined in the work task database DB of the server 1. The CPU 201 further makes the display unit 205 display the to-do task C in which the obtained task items are arranged in a chronological order with the date when a user logged in to the system being the reference date.

Next, if the task done button B of any one task item (for example, "payment of employees' resident tax for July" or the like) displayed in the to-do task C is selected and operated, the CPU 201 controls the wireless communication unit 206 to send the operation signal relating to the task done button B of the task item to the server 1 via the communication network N (step S2).

The display unit 205 further cancels the display of the task item whose task done button B is selected and operated by a user and moves up and displays the task items and, pop-ups thereafter (not shown in the drawing).

In the server 1, if the operation signal of the task done button B which is sent from the terminal device 2 is received by the communication unit 106, the CPU 101 reads out the first determination program DB a from the storage unit 103 and refers to the work task database DB to determine whether there exists a related task which is associated with the task item which is already carried out and whose task done button B is selected and operated by a user in accordance with the first determination program 103a (step S3).

If it is determined that there exists a related task which is associated with the task item which is already carried out (step S3; YES), the CPU 101 reads out the second determination program 103b from the storage unit 103 and refers to the work task database DB to determine whether the related task is the journal input of the transaction in accordance with the second determination program. 103b (step S4).

On the other hand, if it is determined that there does not exist a related task which is associated with the task item which is already carried out (step S3; NO), the CPU 101 ends the journalizing process.

If it is determined that the related task is the journal input of the transaction in step S4 (step S4; YES), the CPU 101 reads out the journalizing process program 103c from the storage unit 103 and executes the journalizing process program 103c (step S5).

Next, the CPU 101 refers to the work task database DB and automatically sets various data of "account heading" and "abstract" (for example, "deposit received", "payment of employees' resident tax for July, 20xx" and the like) relating to the task item which is already carried out in the corresponding data input regions of the "account heading" and "transaction abstract" as the journal data (step S6).

On the other hand, if it is determined that the related task is not the journal input of the transaction in step S4 (step S4; NO), the CPU 101 refers to the work task database DB and executes any other process (for example, POP generation completion register process and the like) associated with the task item which is already carried out (step S7), and thereafter, ends the journalizing process.

Next, the CPU 101 refers to the work task database DB to determine whether the journal input requires cooperation with the salary management process (step S8).

Here, if it is determined that the journal input requires cooperation with the salary management process (step S8; YES), the CPU 101 automatically sets the amount which is calculated in the salary management process for the task item which is already carried out (for example, "payment of employees' resident tax for July, 20xx" or the like) in the corresponding data input region of "amount of transaction" as the journal data (step S9).

On the other hand, if it is determined that the journal input does not require cooperation with the salary management process (step S8; NO), the CPU 101 skips step S9.

Thereafter, the CPU 101 controls the communication unit 106 to send the display instruction of the journal input screen G and the journal data which is set in the data input regions to the terminal device 2 via the communication network N (step S10).

In the terminal device 2, if the display instruction of the journal input screen G which is sent from the server 1 is received by the wireless communication unit 206, the CPU 201 reads out the input screen display program 203b from the storage unit 203 and makes the journal input screen G displayed in the display unit 205 in accordance with input screen display program 203b (step S11; see FIG. 6).

In particular, the CPU 201 makes the journal input screen G displayed in the display unit 205, the journal data set for the data input regions of "account heading", "transaction abstract" and "amount of transaction" being input in the corresponding columns in the journal input screen G as a result of the journal input associated with the task item (for example, "payment of employees' resident tax for July" or the like) which is already carried out and whose task done button B is selected and operated.

Thereafter, data is input in the columns which are blank in the journal input screen G as needed on the basis of predetermined operations performed by a user on the operating unit 204 and if the register button which is provided at a predetermined position (for example, at the lower left corner or the like) is selected and operated, the CPU 201 registers the transaction whose journal input is carried out in the ledger (not shown in the drawing) (step S12) and ends the journalizing process.

As described above, according to the task management system 100 of the embodiment, in the case where a task item which needs to be carried out defined in the work task database DB has been carried out, for example, the work task database DB is referred to to determine whether there exists a related task which is associated with the task item which is already carried out and whether the related task corresponds to the accounting process. If it is determined that there exists a related task and the related task is the accounting process, the accounting process corresponding to the related task is executed. Thus, not only the task item defined in the work task database DB and the accounting process can be carried out smoothly in association with each other, various data relating to the task tem which is already carried out can be automatically set in the data input regions corresponding to the related task by referring to the work task database DB. Therefore, even the sole proprietors and the like who are not used to such accounting process can easily carry out the accounting process.

In particular, if it is determined that the related task is the journal input of the transaction, the journalizing process for carrying out the journal input of the transaction as the accounting process is executed. Thus, even the journal input which requires a technical knowledge can be carried out with only a small burden on the sole proprietors and the like who are not used to such accounting process.

In particular, various data of the account heading and the abstract relating to the task item which is already carried out defined in the work task database DB can be automatically set in the corresponding data input regions as the journal data.

Further, if the related task is determined as being the journal input of the transaction, various data relating to the accounting process and relating to the accounting related process which is other than the journalizing process (for example, the salary management process or the like) can be automatically set in the corresponding data input regions as the journal data. Thus, the accounting process can be carried out in cooperation with the accounting related process other than the journalizing process with only a small burden on the sole proprietors and the like who are not used to such accounting process.

The present invention is not limited to the above described embodiment and the design can be modified and various design changes can be made within the scope of the invention.

For example, in the above embodiment, if it is determined that there exists a related task in the first determination process, the second determination process to determine whether the related task is the journal input of the transaction is carried out. However, this is merely an example and is not limitative in any way. The second determination process does not need to be carried out.

That is, if it is determined that there exists a, related task in the first determination process, the accounting process corresponding to the related task may be automatically executed without performing the determination whether the related task is the journal input of the transaction.

Further, the above described configuration of the task management system 100 including the server 1 and the terminal device 2 is merely an example and is not limitative in any way.

That is, although the server 1 is made to function as the task managing device, the terminal device 2 may include functions as the first determining unit and the process executing unit, and the terminal device may be made to function as the task managing device.

Further, in the above embodiment, the operating unit 204 of the terminal device 2 includes the touch panel. However, this is merely an example and is not limitative in any way.

For example, the touch panel can be replaced as needed with mechanical keys or buttons, for example, which can be pushed.

Further, in the above embodiment, functions as the first determining unit and the process executing unit are realized by the CPU 101 of the server 1 executing the predetermined programs or the like. However, this is not limitative in any way. For example, the above functions may be realized by the determining unit and the process executing unit (both not shown in the drawing) formed by predetermined logic circuits.

Further, as for the computer readable medium storing the programs for executing the processes, a non-volatile memory such as a flash memory, a portable recording medium such as a CD-ROM or the like can be used other than the ROM, hard disk and the like. Further, as for a medium providing program data via a predetermined communication line, a carrier wave can also be used.

While some embodiments of the present invention are described, the scope of the present invention is not limited to these embodiments but encompasses the scope of the invention recited in the claims and the equivalents thereof.

What is claimed is:

1. A task support device comprising:
a memory that stores management information and data history information, wherein the management information defines a plurality of task items to be completed by a user of the task support device and includes information indicating whether an associated past accounting process task is to be carried out for each of the task items after the task item is completed, and wherein the data history information includes past data associated with each past accounting process task, the past data being data comprising an associated completion due date for each task item and an associated predetermined data input item for each past accounting process task having been previously registered by the user; and
a processor that performs a process, wherein the process includes:
a task display process that displays, on a display of the task support device, a task screen in which each of the plurality of task items are displayed with its associated past accounting process task, predetermined data input item, completion due date, and a button which is selectable by the user and indicates completion of the associated task item when selected;
a determination process that determines, when the user selects a button associated with any one of the plurality of task items to indicate completion of the task item associated with the selected button, whether the associated past accounting process task is to be carried out after the task item is completed based on the stored management information associated with the task item;
a screen switching process that switches the screen displayed on the display from the task screen to an accounting process screen for the user to perform the associated past accounting process task when it is determined in the determination process that the associated past accounting process task is to be carried out after the task item is completed,
wherein the screen switching process switches the screen displayed on the display to the accounting process screen, the accounting process screen being in a state in which the past data has been automatically entered in a data input region of the accounting process screen; and a registration process that registers the past data automatically entered in the data input region to a ledger responsive to the user selecting a button displayed on the accounting process screen.

2. The task support device according to claim 1, wherein the past accounting process task is a journalizing process task.

3. The task support device according to claim 2, wherein the data input item is indicative of an accounting heading or settlement method.

4. A task support method performed by a task support device comprising a memory storing (i) management information defining a plurality of task items to be completed by a user of the task support device and including information indicating whether an associated past accounting process task is to be carried out for each of the task items after the task item is completed, and (ii) data history information includes including past data associated with each past accounting process task, the past data being data comprising an associated completion due date for each task item and an associated predetermined data input item for each past accounting process task having been previously registered by the user, the method comprising:

displaying, on a display of the task support device, a task screen in which each of the plurality of task items are displayed with its associated past accounting process task, predetermined data input item, completion due date, and a button which is selectable by the user and indicates completion of the associated task item when selected;

determining, when the user selects a button associated with any one of the plurality of task items to indicate completion of the task item associated with selected button, whether the associated past accounting process task is to be carried out after the task item is completed based on the stored management information associated with the task item;

switching the screen displayed on the display from the task screen to an accounting process screen for the user to perform the associated past accounting process task, when it is determined in the determining that the associated past accounting process task is to be carried out after the task item is completed, wherein the switching of the screen displayed on the display is performed to switch to the accounting process screen, the accounting process screen being in a state in which the past data has been automatically entered in a data input region of the accounting process screen; and registering the past data automatically entered in the data input region to a ledger responsive to the user selecting a button displayed on the accounting process screen.

5. The task support method according to claim 4, wherein the past accounting process task is a journalizing process task.

6. The task support method according to claim 5, wherein the data input item is indicative of an accounting heading or settlement method.

7. A non-transitory computer-readable medium having stored thereon a program that is executable by a computer comprising a memory storing (i) management information defining a plurality of task items to be completed by a user of a task support device and including information indicating whether an associated past accounting process task is to be carried out for each of the task items after the task item is completed, and (ii) data history information including past data associated with each past accounting process task, the past data being data comprising an associated completion due date for each task item and an associated predetermined data input item for each past accounting process task having been previously registered by the user, the program being executable by the computer to cause the computer to perform a process comprising:

a task display process that displays, on a display of the task support device, a task screen in which each of the plurality of task items are displayed with its associated past accounting process task, predetermined data input item, completion due date, and a button which is selectable by the user and indicates completion of the associated task item when selected;

a determination process that determines, when the user selects a button associated with any one of the plurality of task items to indicate completion of the task item associated with the selected button, whether the associated past accounting process task is to be carried out after the task item is completed based on the stored management information associated with the task item;

a screen switching process that switches the screen displayed on the display from the task screen to an accounting process screen for the user to perform the associated past accounting process task when it is determined in the determination process that the associated past accounting process task is to be carried out after the task item is completed, wherein the screen switching process switches the screen displayed on the display to the accounting process screen, the accounting process screen being in a state in which the past data has been automatically entered in a data input region of the accounting process screen; and a registration process that registers the past data automatically entered in the data input region to a ledger responsive to the user selecting a button displayed on the accounting process screen.

8. The non-transitory computer-readable medium according to claim 7, wherein the past accounting process task is a journalizing process task.

9. The non-transitory computer-readable medium according to claim 8, wherein the data input item is indicative of an accounting heading or settlement method.

* * * * *

UNITED STATES PATENT AND TRADEMARK OFFICE
CERTIFICATE OF CORRECTION

PATENT NO.        : 10,430,235 B2
APPLICATION NO.   : 15/256515
DATED             : October 1, 2019
INVENTOR(S)       : Masaharu Meki Page 1 of 1

It is certified that error appears in the above-identified patent and that said Letters Patent is hereby corrected as shown below:

In the Claims

Column 13, Line 21, Claim 4, Line 8, before "including" delete --includes--.

Signed and Sealed this
Eleventh Day of February, 2020

Andrei Iancu
*Director of the United States Patent and Trademark Office*